Jan. 3, 1933.  A. E. YOUNG  1,893,214
MEASURING APPARATUS
Filed Dec. 10, 1931
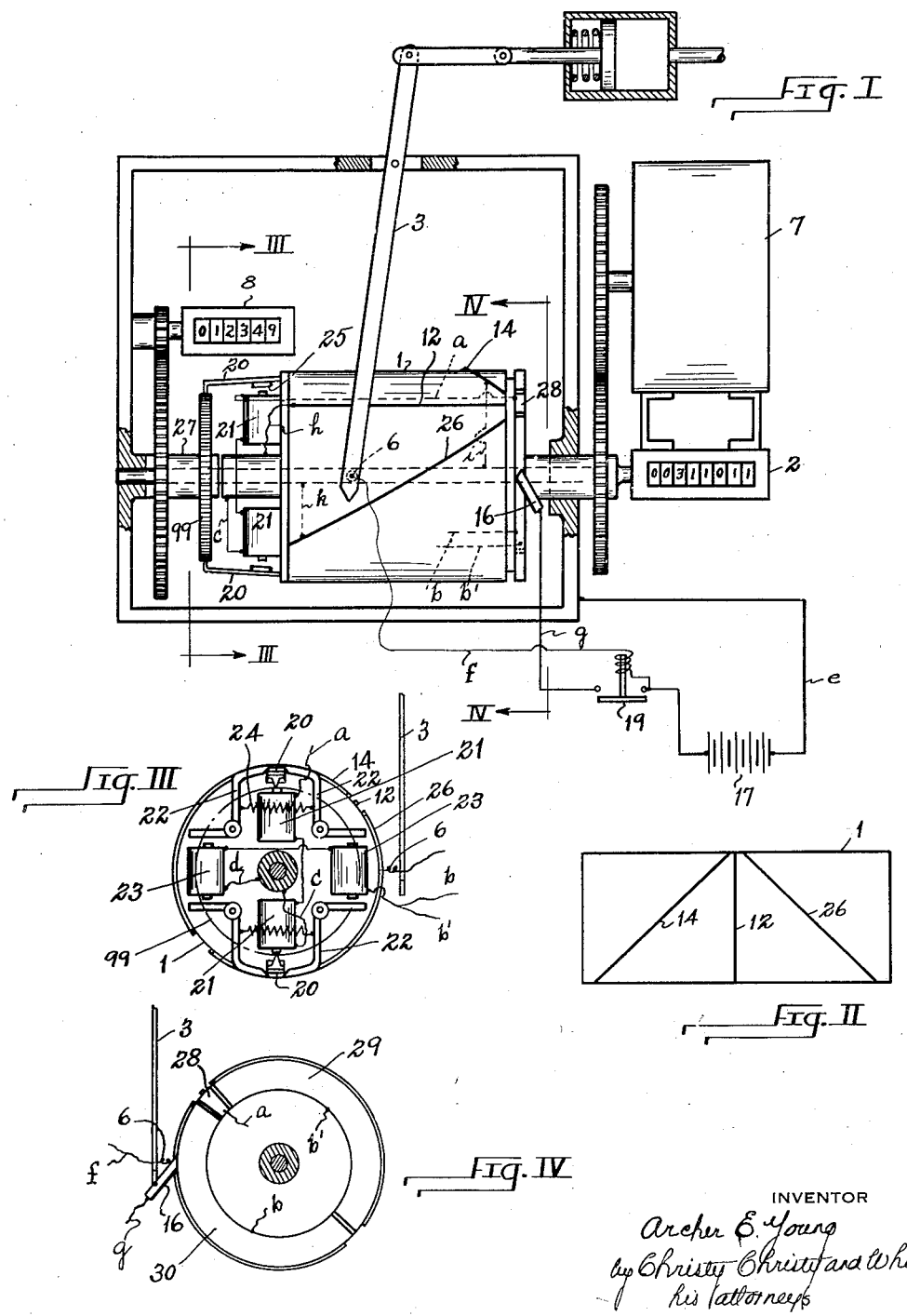
INVENTOR
Archer E. Young
by Christy Christy and Wharton
his attorneys Patented Jan. 3, 1933

1,893,214

UNITED STATES PATENT OFFICE

ARCHER E. YOUNG, OF PITTSBURGH, PENNSYLVANIA

MEASURING APPARATUS

Application filed December 10, 1931. Serial No. 580,089.

My invention relates to apparatus for aggregating throughout prolonged intervals of time the value of a variable; it consists in improvements in apparatus of the general sort, such as that shown and described in Letters Patent of the United States No. 1,816,950, granted me August 4, 1931. The improvements are such as to render the apparatus more perfectly adapted to particular conditions of service. The invention is of general applicability to apparatus of the character which I am about to described; but, as an instance of a particular field of use, where the value of the invention will be realized, I name the field of measuring gas flowing in a supply main for industrial or domestic consumption.

In the accompanying drawing Fig. I is a view, partly in elevation, partly in vertical section, of gas-measuring apparatus embodying the feature which constitutes my present invention. From the showing afforded by Fig. I a certain electromagnet has, for clearness, been omitted. Fig. II is a diagrammatic view showing to smaller scale the surface of a certain cylinder included in the apparatus, projected in a single plane; Figs. III and IV are views in cross-section, on the planes of section indicated by the lines III—III and IV—IV, respectively, in Fig. I.

A moving member, conveniently in the form of a cylinder 1, mounted for rotation, may be caused to move in synchronism with a positive meter 7—a meter, that is to say, which makes direct volumetric measurement of gas as it flows from a source of supply to a place of consumption. In such case each revolution of the cylinder will be indicative of the flow of a certain volume of gas. The cylinder may be geared directly to a tally 2, and the apparatus may be so adjusted that the tally shall afford direct reading of the cubic feet of gas passed by the meter.

A pivoted beam 3 may by known instrumentalities, such as those diagrammatically indicated in Fig. I, be caused to swing in response to variation in the pressure of the gas as it is measured, so that the particular position of the beam will always be indicative of the instant condition of pressure. The beam is mounted to swing in a plane approximately tangent to cylinder 1 and it carries an electric contact-piece 6 which in the range of beam-swing approximates the line of tangency.

The surface of cylinder 1, formed elsewhere of nonconducting material, carries strips 12, 14, and 26 of conducting material. The strip 12 conveniently extends in precise longitudinal extent upon the cylinder, and the strips 14 and 26 lie upon opposite sides of strip 12 and extend obliquely upon the cylinder diverging from one another and diverging symmetrically with respect to strip 12. The intervals between the strip 12 and the two strips 14 and 26, measured circumferentially of the cylinder, are at every point throughout the length of the cylinder equal, and at successive points progressively greater, from the right-hand end of the cylinder, as seen in Fig. I, leftward. As the cylinder rotates the range of angular turning between the successive contacts of the contact-piece 6 with strips 26, 12, and 14 will be greater or less, according to the position of beam 3 in its range of swing. The strips 14 and 26 will be so minutely shaped and disposed upon the surface of the cylinder as to afford ranges of angular turning between such successive contacts which shall bear accurately determined relationship to the position of beam 3 in its range of swing. In the case in hand, it may be understood that, as the pressure to which the stream of gas under mensuration is subject increases, contact-piece 6 will move along cylinder 1 from right to left (Fig. I), and that, accordingly, as pressure increases the range of angular turning of cylinder 1 between the succeeding contacts of contact-piece 6 with strips 26, 12, and 14 will be enlarged. The strips may be so relatively positioned as to afford correction for variation in the condition of presure under which the gas is measured, in accordance with Boyle's law. Indeed, more accurate correction may be made than computation under Boyle's law can afford; for as pressure increases an appreciable factor of inaccuracy appears in computation under Boyle's law, and by modification in the particular relative placement of these strips that factor of inaccuracy may be eliminated.

Leaving out of account for the moment, part 28, through lead $a$, with the electromagthat at times a back-flow of gas through the main will occur. And manifestly back-flow will, unless corrective provision is made, disturb, and perhaps very seriously disturb, measurement. The provision, in the apparatus which I am describing, of the contact strip 26 constitutes such corrective. The strip 26, arranged on the opposite side of strip 12, and symmetrically, when compared with strip 14 (see Fig. II), co-operates with strip 12, when the cylinder is turning backward, precisely as strip 14 co-operates with strip 12 when the cylinder is turning forward. Backward turning of the positive meter 7 effects backward turning of cylinder 1, and, by means which are in part the same and in part the duplicate of those described, backward turning of cylinder 1 effects diminution in the total reading afforded by tally 8. And, as in forward turning, correction will automatically be effected for variation in pressure.

In the forward turning of cylinder 1 strip 26 is of no effect to disturb the result, nor in the backward turning of the cylinder is strip 14 of any effect, for in such case when, after contact of contact-piece 6 with strip 14 (26) the clutch has been opened, a succeeding contact of the contact-piece 6 with strip 26 (14) will merely energize momentarily the magnets 23, swing the latches (then inactive) through an ineffective range, and allow them under spring tension to resume their normal inactive positions, shown in Fig. III.

It is manifest that for all purposes here described the ring parts 29 and 30 might be continuous. I have, however, found it advantageous to form them as separate parts for, in such case, I may make other adaptation: I may remove strip 12, relocate (if need be) strips 14 and 26, connect one of the two remaining strips with electromagnets 21 and the other with electromagnets 23, and thus employ one strip as the clutch-closing strip and the other as the clutch-opening strip. Such adaptation of the instrument may be made in situations where back-flow is not a disturbing factor.

I claim as my invention:

1. In apparatus for aggregating the value of a variable during a given interval of time a carrier movable in either of two opposite directions, three electric contact strips borne by such carrier and extending thereon in directions transverse to the direction of movement and diverging one from another, two of such strips being oppositely divergent from the third arranged between them, a tally, a clutch arranged between said carrier and the tally, a contact-piece movable transversely of the direction of movement of the carrier in accord with variation in the value of the variable and adapted as the carrier moves to make successive contacts with the strips borne thereby, electric means rendered effective by contact of the contact-piece with the mediately situated strip for closing said clutch, and electric means rendered effective in consequence of contact of said contact-piece with either of the said oppositely divergent strips for releasing said clutch.

2. In means for aggregating the value of a variable during a given interval of time a member movable in response to variation in the value of a variable and bearing an electric contact-piece, a second member arranged adjacent the member first named and movable in continuity in either of two opposite directions, a tally, a clutch arranged between the second movable member and the tally, means for closing and releasing said clutch including a clutch-closing and a clutch-opening circuit, and means borne by the second movable member and adapted in co-operation with the movable member first named to effect successive closing of the two said circuits in the order in which they are named above, whichever be the direction of movement of the second movable member, and at a time interval which is great or less, according to the instant value of the variable.

3. In gas measuring apparatus the combination of a positive volumetric meter, a cylinder rotatable in either direction in response to operation of the positive meter, a tally, a clutch arranged between cylinder and tally, whereby cylinder rotation may effect tally operation, three contact strips extending longitudinally upon said cylinder and so relatively placed that two strips arranged on opposite sides of the third diverge from it oppositely in their extent from one end of the cylinder to the other, a contact-piece movable longitudinally of the cylinder and responsive in such movement to pressure upon the gas under measurement, said contact-piece being adapted as the cylinder rotates to make successive contact with the cylinder-borne strips, means subject to electric control and made effective by contact of said contact-piece with the third-named and centrally arranged strip for closing said clutch, and means subject to electric control and made effective by ensuing contact of said contact-piece with either of the two said oppositely arranged strips for opening said clutch.

In testimony whereof I have hereunto set my hand.

ARCHER E. YOUNG.